Sept. 20, 1927.  
K. A. KILBOURNE  
1,642,779  
APPARATUS FOR SPRAYING LIQUID HYDROCYANIC ACID  
Filed Jan. 25, 1924  2 Sheets-Sheet 2

Inventor  
K. A. Kilbourne  
by  
F. A. Witherspoon  
Attorney

Patented Sept. 20, 1927.

1,642,779

UNITED STATES PATENT OFFICE.

KENNETH A. KILBOURNE, OF MONROVIA, CALIFORNIA, ASSIGNOR TO AMERICAN CYANAMID COMPANY, OF NEW YORK, N. Y., A CORPORATION OF MAINE.

APPARATUS FOR SPRAYING LIQUID HYDROCYANIC ACID.

Application filed January 25, 1924. Serial No. 688,552.

This invention relates to a method of and an apparatus for use in spraying liquid hydrocyanic acid and the apparatus is primarily intended as a portable device mounted on wheels, not shown, which may be either horse or power driven. The invention involves a method of fumigating in which the measurement of the liquid should be accurate to a high degree or to within from say one half of one per cent or higher, and in which there should be a large number of applications of the fumigant following one another in rapid succession.

The object of the invention is to provide an apparatus that will be serviceable in general spraying work and particularly suitable for spraying citrus trees in which case the said trees are temporarily enclosed in a tent, not shown, and the application to each individual tree is rapidly and accurately carried out. In carrying out the method the hydrocyanic acid is preferably transported in the form of a liquid and applied to the trees in the form of a vapor thereby simplifying the application and transportation of this most poisonous compound.

With these and other objects in view the invention consists in the novel steps and combinations of steps constituting the process and in the novel parts and combinations of parts constituting the apparatus, all as will be more fully hereinafter described and more particularly pointed out in the claims.

Referring to the accompanying drawings forming a part of this specification in which like numerals designate like parts in all the views:—

Figure 1:
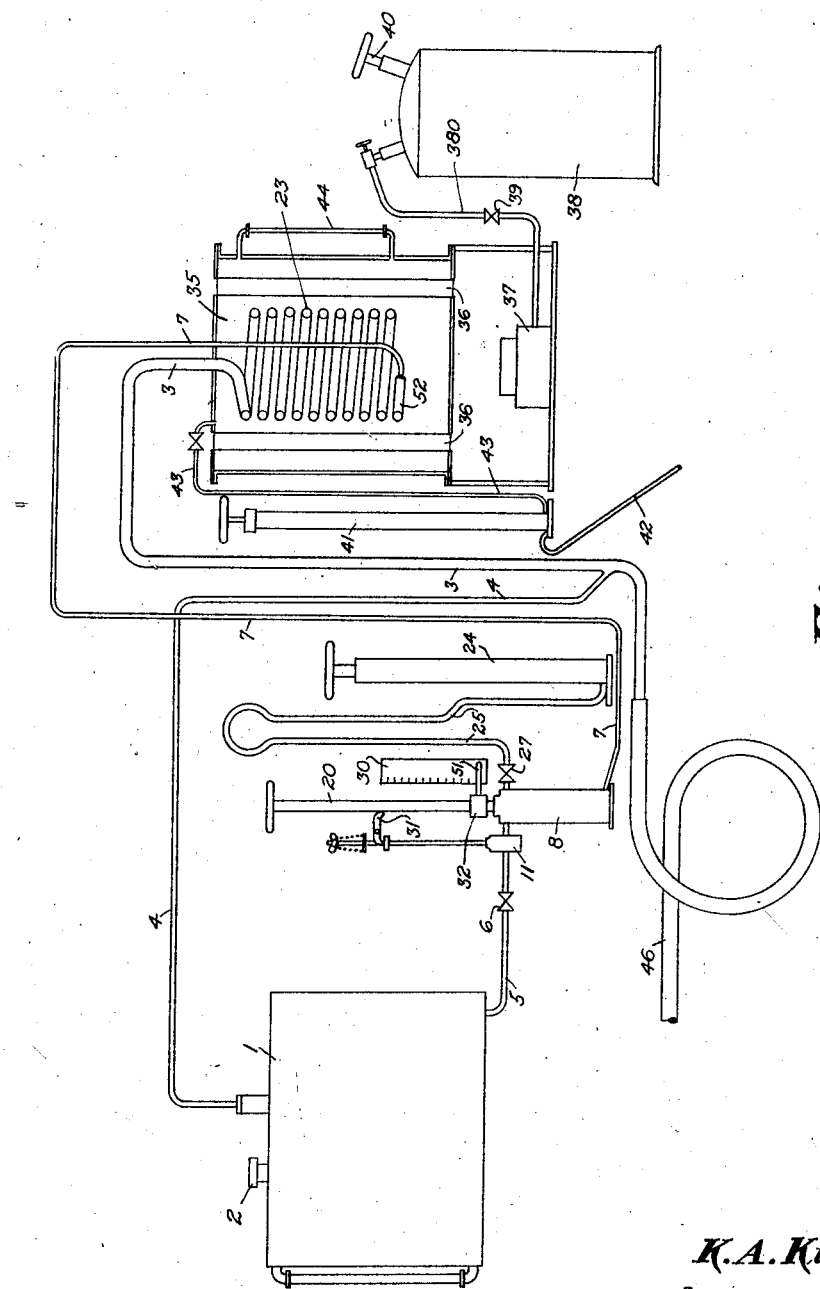
Figure 1 is a diagrammatic elevational view of an apparatus made in accordance with this invention.

1 represents a tank for containing liquid hydrocyanic acid or other fumigant, 2 the charging plug used in filling the tank, 4 a vent pipe to carry off the vapors that arise from the liquid and 3 a hose or other pipe with which said vent is connected. 5 indicates a pipe connecting the measuring cylinder 8 with the supply tank 1, and interposed in this pipe is the check valve 6 to stop any back flow of liquid to the tank and also a slide valve 11 to permit the opening up and shutting off of the flow of liquid from said tank 1. Said valve 11 is automatically operated when the hollow handle 20 of the measuring device is raised or lowered as will be more fully described hereinafter. The liquid measuring container 8 into which the hollow cylindrical handle 20 enters is provided at its upper end with the stuffing box 21 in which said hollow handle moves, and rigidly attached to the bottom of said measuring cylinder 8 is a pipe 7 provided with an extension 22 vertically disposed inside said hollow handle 20 as shown. This pipe 7 leads to the bottom end 52 of the vaporizing coils 23 and from the top end of said coils leads the pipe 3 as illustrated. 24 is an air pump used to supply air under pressure through the pipe 25 to the top of the measuring cylinder 8 and thus expel the hydrocyanic acid from said cylinder 8 up into the hollow handle 20, into the extension 22, inside said hollow handle, and out of said extension through said pipe 7 into the lower end 52 of the vaporizing coils 23, all as will be clear from the drawings. The upper portion 26 of the pipe 25 is located above the tank 1 so that in case of leaks in the valves the liquid cannot get back to the air pump 24. A check valve 27 is located in said pipe 25 close to the measuring cylinder 8, as indicated, and 30 represents a scale disposed parallel with the cylindrical plunger handle 20 to indicate the amount of liquid that may be discharged when the plunger is set at any point, as will be more fully described hereinafter.

Figure 2:
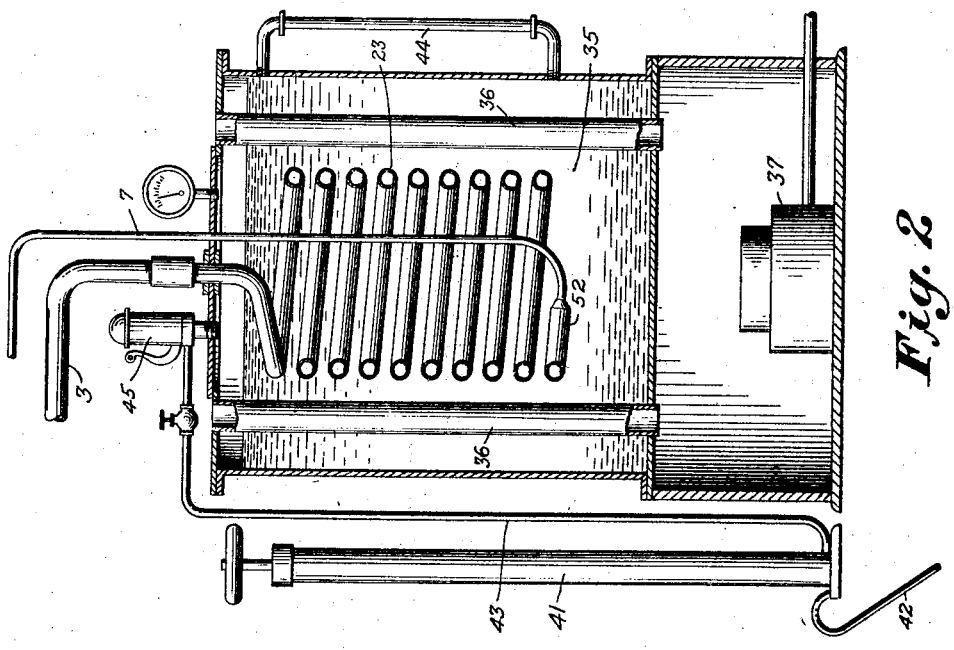
Figure 2 is an enlarged sectional view of the boiler portion of the apparatus shown in Figure 1.
Figures 3, 4:
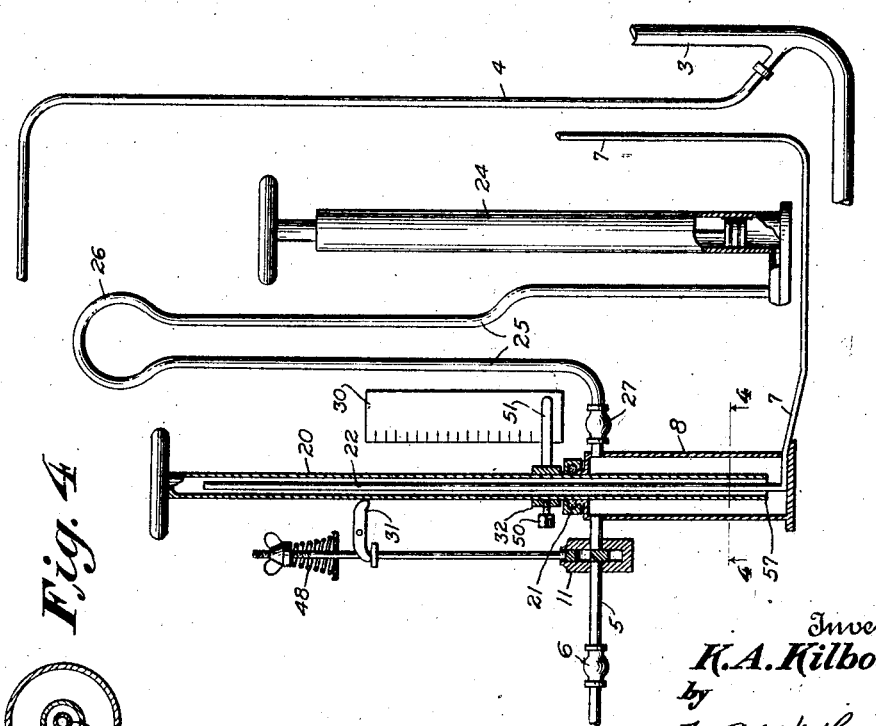
Figure 3 is an enlarged partially sectional view of the pump and measuring device shown in Figure 1.
Figure 4 is a sectional view taken on the line 4—4 of Figure 3 looking in the direction of the arrows.

31 is a pivoted trip device which operates the valve 11 and which is actuated by the member 32 rigid with the hollow cylindrical plunger handle 20. 35 represents a boiler which stores up and supplies heat to the vaporizing coils 23, and 36 indicates vertical fire tubes to permit the escape of gases from an oil burner 37. 38 represents a fuel tank connected with the burner by the pipe 380 provided with a check or other valve 39. 40 is a pressure pump to force the liquid fuel under pressure to the burner 37, and 41 is a boiler feed pump supplying liquid by suction through the pipes 42 and 43, (Fig. 2). 44 is a gage on the boiler and 45 is a safety valve with which the boiler feed pump is connected. 46 indicates any suitable connection between the pipe 3 and the space (not shown) to be fumigated.

The operation of this device will be clear from the foregoing but may be briefly summarized as follows:—

The tank or container 1 is first filled with liquid hydrocyanic acid by removing the plug 2 and the handle 20 is raised until its bottom end 57 is at the top of the container 8 whereupon the collar member 32 rigid with said handle 20 strikes the trip member 31, turns the same on its pivot and causes it to force the valve 11 downward and thus open said valve to permit the flow of liquid into the cylinder 8 through the pipe 5. As the measuring cylinder 8 is thus filled, the hollow handle 20 is pressed down which permits the valve 11 to be closed under the action of the spring 48. By means of the scale 30 the set screw 50 and index 51 the lower end 57 of the hollow handle may be set at any desired point, and the parts are so calibrated that the desired amounts of fumigant to be discharged are read off directly from the scale 30. Air is next pumped into the cylinder 8 from the pump 24 and the liquid therein forced up through the hollow handle 20 and out through the pipe 7. This liquid enters the coils 23 at the bottom end 52 of the same and in passing up through said coils the speed of flow of said liquid is materially reduced, due to the diameter of said coils being greater than that of the pipe 7. In passing through the coils heat is transferred from the water in the boiler 35 to the liquid fumigant and completely changes it to vapor. The vapor thus produced escapes through the pipes 3 and 46 to the space to be fumigated. By employing a boiler constructed of heavy materials and heated by a burner of large capacity one is enabled to vary at will, within wide ranges, the amount of heat to be imparted to the fumigating liquid and he is assured in every case of the desired amount of heat to complete the vaporization of the fumigant in the short time that it requires for the latter to pass through the coils 23. As the vaporizer 23 and its associated parts are entirely distinct from the rest of the apparatus, there is but little danger of fire or other accidents.

The advantages of this improved process and apparatus are particularly marked when starting the operation for a days work in as much as all of the pipe lines, hose, etc., can be warmed up by pumping a supply of air from the pipe 24 through the heated boiler without discharging any gas. This is conveniently accomplished by raising the end 57 of the handle 20 above any liquid that may be in the cylinder 8 but not high enough to open valve 11, and at any time should a tendency of the fumigant to condense in the pipe lines occur, thereby vitiating the precision of the dosage, this same operation can be repeated. At the end of each operation, however, the pumping of the warm air through the lines is a simple procedure which involves merely operating the pump 24 after the discharge of the liquid when the heated air passing through the lines clears them effectually of any condensed liquid.

By this method of operation one also obtains immediately at the beginning of the discharge a maximum concentration of vapor unadulterated with air or any other gas when it is blown in at the base of the tree, for example, and the envelope of concentrated gas dissipates upward because of its temperature and low gravity bathing the tree in a fairly concentrated gas mixture which is particularly effective for the killing of various scale insects and other pests.

It is obvious that those skilled in the art may vary the construction as well as the arrangement of parts without departing from the spirit of the invention, and therefore, it is not desired to be limited to the above disclosure except as may be required by the claims.

What is claimed is:—

1. In a fumigating apparatus the combination of a supply tank adapted to contain a liquid fumigant, a measuring chamber adapted to deliver a predetermined amount of liquid, a plurality of tubes in said chamber and concentrically arranged, and air pressure means for forcing said liquid through said tubes into the space to be fumigated.

2. In a fumigating apparatus the combination of a supply tank adapted to contain a liquid fumigant, a measuring chamber adapted to deliver a predetermined amount of liquid, a plurality of tubes in said chamber and concentrically arranged, one of said tubes being movable, and air pressure means for forcing said liquid through said tubes into the space to be fumigated.

3. In a fumigating apparatus the combination of a supply tank adapted to contain a liquid fumigant, a measuring chamber adapted to deliver a predetermined amount of liquid, a plurality of tubes in said chamber and concentrically arranged, one of said tubes being movable, and air pressure means for forcing said liquid through said tubes into the space to be fumigated, the amount of liquid ejected being measured by the difference between the height of said chamber and the opening of said movable tube.

4. In a fumigating apparatus the combination of a supply tank adapted to contain a liquid fumigant, a measuring chamber adapted to deliver a predetermined amount of liquid, a plurality of tubes in said chamber and concentrically arranged, the outer of said tubes being movable, and air pressure means for forcing said liquid through said tubes into the space to be fumigated.

In testimony whereof I affix my signature.

KENNETH A. KILBOURNE.